United States Patent
Fan

(10) Patent No.: US 10,621,454 B2
(45) Date of Patent: Apr. 14, 2020

(54) LIVING BODY DETECTION METHOD, LIVING BODY DETECTION SYSTEM, AND COMPUTER PROGRAM PRODUCT

(71) Applicants: BEIJING KUANGSHI TECHNOLOGY CO., LTD., Beijing (CN); MEGVII (BEIJING) TECHNOLOGY CO., LTD., Beijing (CN)

(72) Inventor: Haoqiang Fan, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/736,228

(22) PCT Filed: Jun. 29, 2015

(86) PCT No.: PCT/CN2015/082643
§ 371 (c)(1),
(2) Date: Dec. 13, 2017

(87) PCT Pub. No.: WO2017/000116
PCT Pub. Date: Jan. 5, 2017

(65) Prior Publication Data
US 2018/0173979 A1    Jun. 21, 2018

(51) Int. Cl.
*G06K 9/00* (2006.01)
*G06K 9/20* (2006.01)

(52) U.S. Cl.
CPC ..... *G06K 9/00906* (2013.01); *G06K 9/00255* (2013.01); *G06K 9/00281* (2013.01);
(Continued)

(58) Field of Classification Search
CPC .......... G06K 9/00906; G06K 9/00255; G06K 9/00281; G06K 9/00288; G06K 9/2027; G06K 9/2036
See application file for complete search history.

(56) References Cited

U.S. PATENT DOCUMENTS 5,315,413 A * 5/1994 Yamamoto ............... H04N 1/58
348/253
6,107,637 A * 8/2000 Watanabe ............. B82Y 10/00
250/208.1
(Continued)

FOREIGN PATENT DOCUMENTS

| CN | 101441710 | 5/2009 |
|---|---|---|
| CN | 101964056 | 2/2011 |

(Continued)

OTHER PUBLICATIONS

Google Scholar Search Results.*
(Continued)

*Primary Examiner* — Qun Shen
(74) *Attorney, Agent, or Firm* — Hamre, Schumann, Mueller & Larson, P.C.

(57) ABSTRACT

The present invention relates to a living body detection method and living body detection system capable of realizing living body detection of a human body, and a computer program product. The living body detection method comprises: respectively using each light source of at least two light sources arranged at different positions to illuminate a face of an object to be detected; capturing a plurality of images of the face of the object to be detected that is illuminated by each light source; calculating a difference image between the plurality of images; and obtaining a detection value of the difference image, and determining that
(Continued)

the object to be detected is a living body if the detection value is greater than a pre-determined threshold value.

13 Claims, 7 Drawing Sheets

(52) U.S. Cl.
CPC ....... *G06K 9/00288* (2013.01); *G06K 9/2027* (2013.01); *G06K 9/2036* (2013.01)

(56) References Cited

U.S. PATENT DOCUMENTS

| | | | |
|---|---|---|---|
| 8,718,320 | B1 | 5/2014 | Martel et al. |
| 2003/0058442 | A1* | 3/2003 | Garab .................... G01N 21/21 356/369 |
| 2003/0139886 | A1* | 7/2003 | Bodzin .................. G01N 21/47 702/28 |
| 2006/0279726 | A1* | 12/2006 | Galambos .......... G06K 9/00221 356/71 |
| 2009/0271719 | A1* | 10/2009 | Clare .................... G09B 29/007 715/762 |
| 2013/0063722 | A1* | 3/2013 | Sparks ...................... G01J 3/44 356/327 |
| 2014/0219519 | A1 | 8/2014 | Yuasa |
| 2014/0294292 | A1* | 10/2014 | Aoba ................. G06K 9/00208 382/159 |
| 2015/0179293 | A1* | 6/2015 | Mukaide .............. G01N 23/083 378/89 |
| 2015/0294155 | A1* | 10/2015 | Sant .................... G06K 9/00657 382/195 |
| 2015/0363670 | A1* | 12/2015 | Sugishita ............... H04N 7/181 382/155 |
| 2016/0091707 | A1* | 3/2016 | Okuno ............... G02B 21/0012 348/79 |

FOREIGN PATENT DOCUMENTS

| | | |
|---|---|---|
| CN | 102332085 | 1/2012 |
| CN | 102622588 | 8/2012 |
| CN | 102789572 | 11/2012 |
| CN | 103077382 | 5/2013 |
| CN | 103106397 | 5/2013 |
| CN | 104143078 | 11/2014 |

OTHER PUBLICATIONS

International Search Report, issued in the corresponding PCT application No. PCT/CN2015/082643, dated Mar. 31, 2016, 4 pages.

First Chinese Office Action, issued in the corresponding Chinese patent application No. 201580000332.2, dated May 3, 2018, 19 pages.

Second Chinese Office Action, issued in the corresponding Chinese patent application No. 201580000332.2, dated Nov. 15, 2018, 16 pages.

Third Chinese Office Action, issued in the corresponding Chinese patent application No. 201580000332.2, dated Apr. 25, 2019, 18 pages.

\* cited by examiner

LIVING BODY DETECTION METHOD, LIVING BODY DETECTION SYSTEM, AND COMPUTER PROGRAM PRODUCT

TECHNICAL FIELD

The present disclosure relates to the field of living body detection, and more particularly, to a living body detection method, a living body detection system, and a computer program product, which are capable of implementing living body detection on a human body.

BACKGROUND

At present, face recognition systems are more and more applied to scenarios that require an ID authentication in fields like security, finance etc., such as remote bank account opening, access control system, remote transaction operating verification etc. In these application fields with high security level, in addition to ensuring that a face similarity of an authenticatee matches with library data stored in a database, first, it needs that the authenticatee is a legitimate biological living body. That is to say, the face recognition system needs to be able to prevent an attacker from attacking using pictures, 3D face models, or masks and so on.

The method for solving the above problem is usually called living body detection, which aims to determine whether an obtained physiological feature comes from a living, in-field, real person. Living body verification schemes acknowledged as mature do not exist among technology products on market, and the conventional living body detection techniques either depend on specific hardware devices (such as infrared came, depth camera) or can prevent only simple attacks from static pictures. In addition, most of the living body detection systems existing in the prior art are cooperated-style, i.e., requiring a person being tested to make a corresponding action or stay fixed in place for a period of time according to an instruction from the systems, so it will affect user experience and efficiency of living body detection. Besides, for example, the accuracy and robustness of other methods by determining whether there is an image border in a detected image can hardly meet the actual demands.

SUMMARY

In view of the above problem, the present disclosure is proposed. The present disclosure provides a living body detection method, a living body detection system, and a computer program product, wherein face of the person being tested is irradiated by two or more light sources sequentially, differences of obtained images are compared, and then it is determined whether there is a match with features of a human face. Since there are prominent facial features (e.g., nose, mouth, chin, etc.) on the human face, but pictures, screens or the like are flat, the human faces can be effectively distinguished from photos and video attackers. A non-cooperated-style living body detection is achieved, a normal user can be effectively distinguished from photo, video, mask attacker, without requiring the user's special cooperation, the security and ease-of-use of the living body detection system are increased.

According to an embodiment of the present disclosure, there is provided a living body detection method, comprising: irradiating a face of an object to be detected using each of at least two light sources arranged in different positions, respectively; capturing a plurality of images of the face of the object to be detected when being irradiated by each of the light sources; calculating a difference image between the plurality of images; and obtaining a detection value of the difference image, and determining that the object to be detected is a living body when the detection value is larger than a predetermined threshold.

In addition, in the living body detection method according to an embodiment of the present disclosure, obtaining a detection value of the difference image, and determining that the object to be detected is a living body when the detection value is larger than a predetermined threshold comprises: determining a facial region from among the plurality of images based on a first image or a second image; extracting a value of the difference image corresponding to the facial region as an image to be detected; obtaining the detection value based on the image to be detected; and comparing the detection value with the predetermined threshold, and determining that the object to be detected is a living body when the detection value is larger than the predetermined threshold.

In addition, in the living body detection method according to an embodiment of the present disclosure, obtaining the detection value based on the image to be detected comprises: inputting the image to be detected into a pre-trained image classifier, generating and outputting, by the image classifier, the detection value corresponding to the image to be detected.

In addition, in the living body detection method according to an embodiment of the present disclosure, the at least two light sources are a first light source and a second light source, the plurality of images are a first image when being irradiated by the first light source and a second image when being irradiated by the second light source, a first pixel value of the first image at a pixel dot (x,y) is I1 (x,y), and a second pixel value of the second image at a pixel dot (x,y) is I2 (x,y), and calculating a difference image between the plurality of images comprises: calculating a difference image J(x,y) of the first image and the second image at a pixel dot (x,y), $J(x,y)=[I1(x,y)-I2(x,y)]/[I1(x,y)+I2(x,y)+eps]$, wherein eps is a non-zero constant.

In addition, in the living body detection method according to an embodiment of the present disclosure, the at least two light sources are a first light source and a second light source, the plurality of images are a first image when being irradiated by the first light source, a second image when being irradiated by the second light source, and a third image when not being irradiated by any of the at least two light sources, a first pixel value of the first image at a pixel dot (x,y) is I1 (x,y), a second pixel value of the second image at a pixel dot (x,y) is I2 (x,y), and a third pixel value of the third image at a pixel dot (x,y) is I3(x,y), calculating a difference image between the plurality of images comprises: calculating a difference image J(x,y) of the first image, the second image, and the third image at a pixel dot (x,y), $J(x,y)=[I1(x,y)-I2(x,y)]/[I1(x,y)+I2(x,y)-I3(x,y)\times 2+eps]$, wherein eps is a non-zero constant.

In addition, in the living body detection method according to an embodiment of the present disclosure, the at least two light sources are a first light source and a second light source, the plurality of images are a first image when being irradiated by the first light source and a second image when being irradiated by the second light source, a first pixel value of the first image at a pixel dot (x,y) is I1 (x,y), and a second pixel value of the second image at a pixel dot (x,y) is I2 (x,y), and calculating a difference image between the plurality of images comprises: calculating a difference image J(x,y) of the first image and the second image at a pixel dot (x,y), $J(x,y)=[I1(x,y)/A(x,y)-I2(x,y)/B(x,y)]/[I1(x,y)/A(x,y)+I2(x,y)/B(x,y)+eps]$, wherein eps is a non-zero constant, $A(x,y)$ and $B(x,y)$ are pre-set compensation images.

In addition, in the living body detection method according to an embodiment of the present disclosure, the at least two light sources are a first light source and a second light source, the plurality of images are a first image when being irradiated by the first light source, a second image when being irradiated by the second light source, and a third image when not being irradiated by any of the at least two light sources, a first pixel value of the first image at a pixel dot (x,y) is I1 (x,y), a second pixel value of the second image at a pixel dot (x,y) is I2 (x,y), and a third pixel value of the third image at a pixel dot (x,y) is I3(x,y), calculating a difference image between the plurality of images comprises: calculating a difference image $J(x,y)$ of the first image, the second image, and the third image at a pixel dot (x,y), $J(x,y)=[(I1(x,y)-I3(x,y))/A(x,y)-I2(x,y)-I3(x,y))/B(x,y)]/[(I1(x,y)-I3(x,y))/A(x,y)+(I2(x,y)-I3(x,y))/B(x,y)+eps]$, wherein eps is a non-zero constant, $A(x,y)$ and $B(x,y)$ are pre-set compensation images.

According to another embodiment of the present disclosure, there is provided a living body detection system, comprising: a light source module including at least two light sources arranged in different positions, a face of an object to be detected being illuminated by each of the at least two light sources, respectively; an image capturing module for capturing a plurality of images of the face of the object to be detected when being irradiated by each of the light sources; a living body detection module for determining whether the object to be detected is a living body, wherein the method of determining whether the object to be detected is living comprises: calculating a difference image between the plurality of images; and obtaining a detection value of the difference image, and determining that the object to be detected is a living body when the detection value is larger than a predetermined threshold.

In addition, in the living body detection system according to another embodiment of the present disclosure, the living body detection module determines a facial region from among the plurality of images based on a first image or a second image, extracts a value of the difference image corresponding to the facial region as an image to be detected, obtains the detection value based on the image to be detected, compares the detection value with the predetermined threshold, and determines that the object to be detected is a living body when the detection value is larger than the predetermined threshold.

In addition, in the living body detection system according to another embodiment of the present disclosure, the living body detection module further comprises a pre-trained image classifier that generates and outputs the detection value corresponding to the image to be detected.

In addition, in the living body detection system according to another embodiment of the present disclosure, the at least two light sources are a first light source and a second light source, the plurality of images are a first image when being irradiated by the first light source and a second image when being irradiated by the second light source, a first pixel value of the first image at a pixel dot (x,y) is I1 (x,y), and a second pixel value of the second image at a pixel dot (x,y) is I2 (x,y), the living body detection module calculates a difference image $J(x,y)$ of the first image and the second image at a pixel dot (x,y), $J(x,y)=[(x,y)-I2(x,y)]/[(x,y)+I2(x,y)+eps]$, wherein eps is a non-zero constant.

In addition, in the living body detection system according to another embodiment of the present disclosure, the at least two light sources are a first light source and a second light source, the plurality of images are a first image when being irradiated by the first light source, a second image when being irradiated by the second light source, and a third image when not being irradiated by any of the at least two light sources, a first pixel value of the first image at a pixel dot (x,y) is I1 (x,y), a second pixel value of the second image at a pixel dot (x,y) is I2 (x,y), and a third pixel value of the third image at a pixel dot (x,y) is I3(x,y), the living body detection module calculates a difference image $J(x,y)$ of the first image, the second image, and the third image at a pixel dot (x,y), $J(x,y)=[I1(x,y)-I2(x,y)]/[I1(x,y)+I2(x,y)-I3(x,y)\times 2+eps]$, wherein eps is a non-zero constant.

In addition, in the living body detection system according to another embodiment of the present disclosure, the at least two light sources are a first light source and a second light source, the plurality of images are a first image when being irradiated by the first light source and a second image when being irradiated by the second light source, a first pixel value of the first image at a pixel dot (x,y) is I1 (x,y), and a second pixel value of the second image at a pixel dot (x,y) is I2 (x,y), the living body detection module calculates a difference image $J(x,y)$ of the first image and the second image at a pixel dot (x,y), $J(x,y)=[I1(x,y)/A(x,y)-I2(x,y)/B(x,y)]/[I1(x,y)/A(x,y)+I2(x,y)/B(x,y)+eps]$, wherein eps is a non-zero constant, $A(x,y)$ and $B(x,y)$ are pre-set compensation images.

In addition, in the living body detection system according to another embodiment of the present disclosure, the at least two light sources are a first light source and a second light source, the plurality of images are a first image when being irradiated by the first light source, a second image when being irradiated by the second light source, and a third image when not being irradiated by any of the at least two light sources, a first pixel value of the first image at a pixel dot (x,y) is I1 (x,y), a second pixel value of the second image at a pixel dot (x,y) is I2 (x,y), and a third pixel value of the third image at a pixel dot (x,y) is I3(x,y), the living body detection module calculates a difference image $J(x,y)$ of the first image, the second image, and the third image at a pixel dot (x,y), $J(x,y)=[(I1(x,y)-I3(x,y))/A(x,y)-I2(x,y)-I3(x,y))/B(x,y)]/[(I1(x,y)-I3(x,y))/A(x,y)+(I2(x,y)-I3(x,y))/B(x,y)+eps]$, wherein eps is a non-zero constant, $A(x,y)$ and $B(x,y)$ are pre-set compensation images.

In addition, in the living body detection system according to another embodiment of the present disclosure, the at least two light sources are programmable controlled light sources disposed at periphery of the image capturing module and integrally constructed together with the image capturing module.

In addition, in the living body detection system according to another embodiment of the present disclosure, the at least two light sources are disposed symmetrically with respect to the image capturing module.

According to yet another embodiment of the present disclosure, there is provided a computer program product, comprising a non-transitory computer-readable medium on which computer program instructions configured to execute the following steps when being run by a computer are stored: capturing a plurality of images of a face of an object to be detected when being irradiated by each of at least two light sources arranged in different positions; calculating a difference image between the plurality of images; and obtaining a detection value of the difference image, and determining that the object to be detected is a living body when the detection value is larger than a predetermined threshold.

It is to be understood that both the foregoing general descriptions and the following detailed descriptions are exemplary and intended to provide further explanations of the claimed technique.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure.

Hereinafter, preferred embodiments of the present disclosure will be described in detail with reference to the accompanying drawings.

Figure 1:
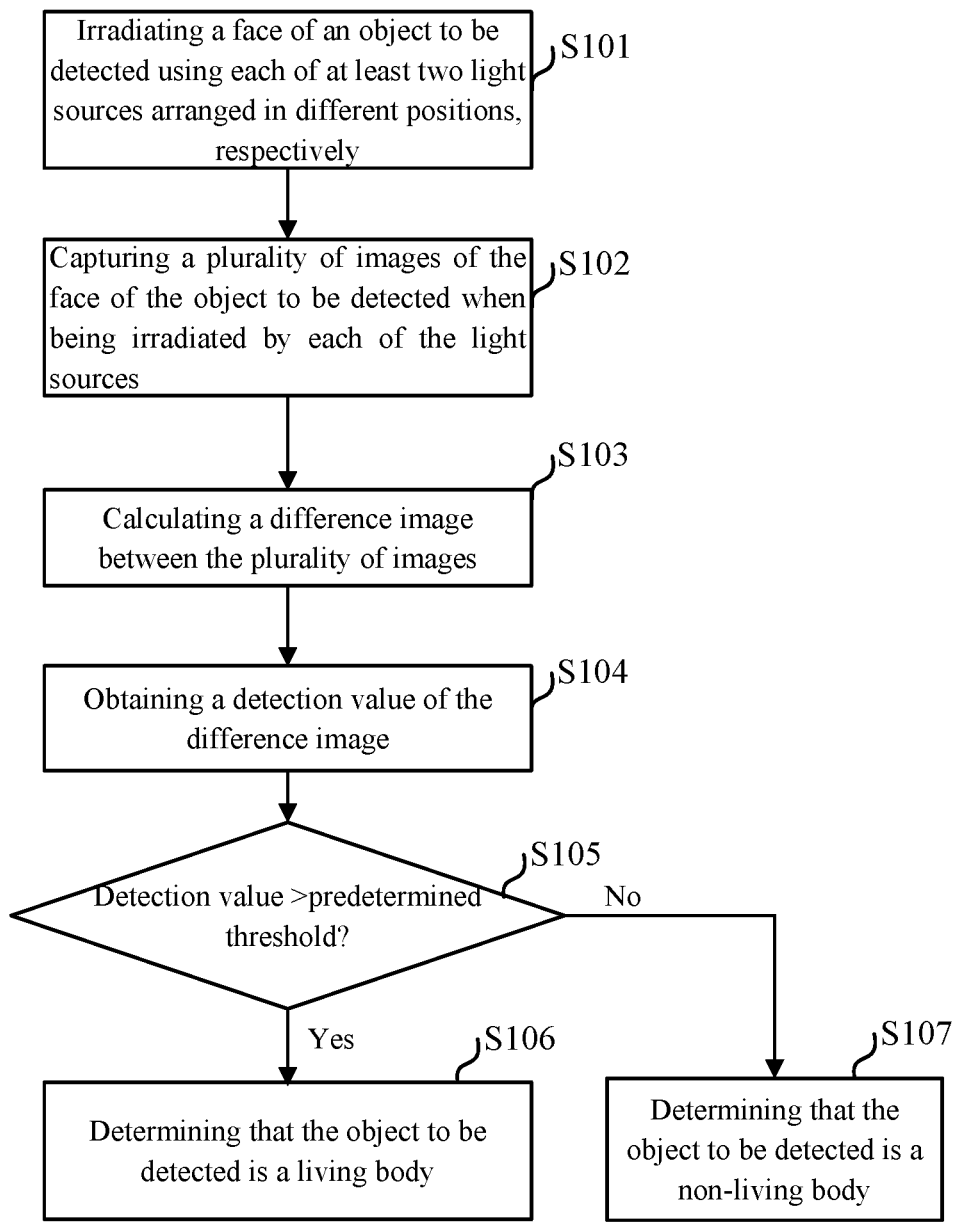
FIG. 1 is a flowchart illustrating a living body detection method according to an embodiment of the present disclosure.

FIG. 1 is a flowchart illustrating a living body detection method according to an embodiment of the present disclosure. As shown in FIG. 1, the living body detection method according to an embodiment of the present disclosure comprises the following steps.

In step S101, a face of an object to be detected is illuminated using each of at least two light sources arranged in different positions, respectively. As will be described in detail below, in an embodiment of the present disclosure, the at least two light sources may be programmable controlled LED light sources that emit infrared or visible light. A first light source of the at least two light sources may be programmable controlled to be turned on and a second light source thereof to be turned off, so as to illuminate the face of the object to be detected; afterwards, the second light source thereof is controlled to be turned on and the first light source thereof is controlled to be turned off, so as to illuminate the face of the object to be detected. Thereafter, the processing advances to step S102.

In step S102, a plurality of images of the face of the object to be detected when being irradiated by each of the light sources are captured. As will be appreciated, steps S101 and S102 may be performed in synchronization, that is, a first image is captured when the first light source of the at least two light sources is turned on and the second light source thereof is turned off to illuminate the face of the object to be detected; afterwards, a second image is captured when the second light source of the at least two light sources is turned on and the first light source thereof is turned off to irradiate the face of the object to be detected. Thereafter, the processing advances to step S103.

In step S103, a difference image between the plurality of images is calculated. In an embodiment of the present disclosure, a difference image between the first image and the second image obtained in step S102 may be directly calculated. In another embodiment of the present disclosure, a difference image between the first image and the second image obtained in step S102 and a third image captured without irradiating of any light source is calculated. Further, in still another embodiment of the present disclosure, when a difference image between the first image and the second image is calculated or a difference image between the first image, the second image, and the third image is calculated, preset compensation images compensating for deviation caused by brightness of the light sources, distance from the object to be detected, and so on. The specific description will be provided below in combination with the drawings. Thereafter, the processing advances to step S104.

In step S104, a detection value of the difference image is obtained. In an embodiment of the present disclosure, a value corresponding to the facial region in the difference image as calculated in the above step S103 is extracted and scaled to a fixed size as the image to be detected. After that, the image to be detected is inputted to a pre-trained image classifier, the image classifier generates and outputs the detection value corresponding to the image to be detected. In an embodiment of the present disclosure, the image classifier may be a pre-trained convolutional neural network (CNN). Thereafter, the processing advances to step S105.

In step S105, it is determined whether the detection value of the difference image as obtained in step S104 is larger than a predetermined threshold. The predetermined threshold is a value determined and set in advance using statistical learning methods such as deep learning, support vector machine, and the like, while taking a large number of face images as positive samples and photos, video playbacks, paper masks, and 3D model images as negative samples. In an embodiment of the present disclosure, the predetermined threshold may be set as 0.5.

If a positive result is obtained in step S105, that is, the detection value is larger than the predetermined threshold, the processing advances to step S106. In step S106, it is determined that the object to be detected is a living body.

Contrarily, if a negative result is obtained in step S105, that is, the detection value is not larger than the predetermined threshold, the processing advances to step S107. In step S107, it is determined that the object to be detected is a non-living body.

In the living body detection method according to an embodiment of the present disclosure as described above, based on that there are prominent facial features (e.g., nose, mouth, chin, etc.) on human face, the image difference due to the unique shape of human face is captured under irradiation of different light sources, but pictures, video on screens and other plane attackers cannot produce the corresponding image difference, a normal user can be effectively distinguished from photo, video, mask attacker, without requiring the user's special cooperation, security and ease-of-use of the living body detection system are increased.

Hereinafter, the living body detection system that executes the above-described living body detection method will be further described with reference to FIG. 2.

Figure 2:
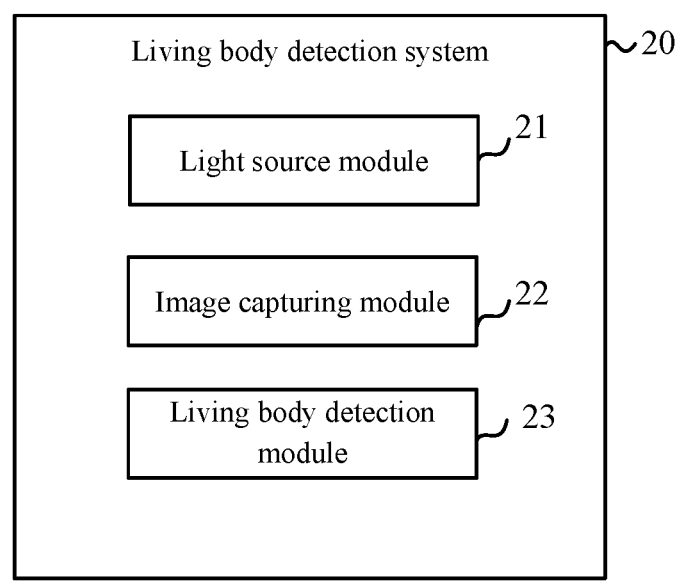
FIG. 2 is a functional block diagram illustrating a living body detection system according to an embodiment of the present disclosure.

FIG. 2 is a functional block diagram illustrating a living body detection system according to an embodiment of the present disclosure. As shown in FIG. 2, the living body detection system 20 according to an embodiment of the present disclosure comprises a light source module 21, an image capturing module 22, and a living body detection module 23. The light source module 21, the image capturing module 22, and the living body detection module 23 may be configured by, for example, hardware, software, firmware, and any feasible combinations thereof.

Specifically, the light source module 21 includes at least two light sources arranged in different positions, a face of an object to be detected is illuminated by each of the at least two light sources, respectively. The at least two light sources may be programmable controlled LED light sources that emit infrared or visible light. A first light source of the at least two light sources may be programmable controlled to be turned on and the second light source to be turned off, so as to illuminate the face of the object to be detected; afterwards, the second light source of the at least two light sources is controlled to be turned on and the first light source thereof is controlled to be turned off to illuminate the face of the object to be detected.

The image capturing module 22 is for capturing a plurality of images of the face of the object to be detected when being irradiated by each of the light sources. When the first light source of the at least two light sources is turned on and the second light source thereof is turned off to illuminate the face of the object to be detected, a first image is captured; afterwards, when the second light source of the at least two light sources is turned on and the first light source thereof is turned off to irradiate the face of the object to be detected, a second image is captured. In addition, when the at least two light sources are both turned off, the image capturing module 22 may capture a third image.

In an embodiment of the present disclosure, the light source module 21 is disposed at periphery of the image capturing module 22 and integrally constructed together with the image capturing module 22. The image capturing module 22 may be physically separated from the subsequent living body detection module 23 or may be physically located in the same place or even within the same housing together with the subsequent living body detection module 23. In the case where the image capturing module 22 is physically separated from the subsequent living body detection module 23, the image capturing module 22 further transmits, in a wired or wireless manner, an acquired image of the face of the object to be detected to the living body detection module 23 as provided subsequently. In the case where the image capturing module 22 and the subsequent living body detection module 23 are physically located at the same position or even inside the same housing, the image capturing module 22 transmits the image of the face of the object to be detected to the living body detection module 23 via an internal bus. Prior to transmitting the video data in a wired or wireless manner or via a bus, it is possible to encode the video data with a predetermined format and compress it as a video packet, so as to reduce traffic and bandwidth that are required by the transmission.

The living body detection module 23 is for determining whether the object to be detected is a living body. Specifically, the living body detection module 23 calculates a difference image between the plurality of images as captured by the image capturing module 22, obtains a detection value of the difference image, and determines that the object to be detected is a living body if the detection value is larger than a predetermined threshold. Exemplarily, the living body detection module 23 may be implemented by hardware such as a processor, or by a computer and software running on the computer.

The living body detection method and the living body detection system according to the embodiments of the present disclosure have been described above with reference to FIGS. 1 and 2. Hereinafter, the first to second exemplary living body detection method and living body detection system according to the embodiments of the present disclosure will be further described with reference to FIGS. 3 to 6.

Figure 3:
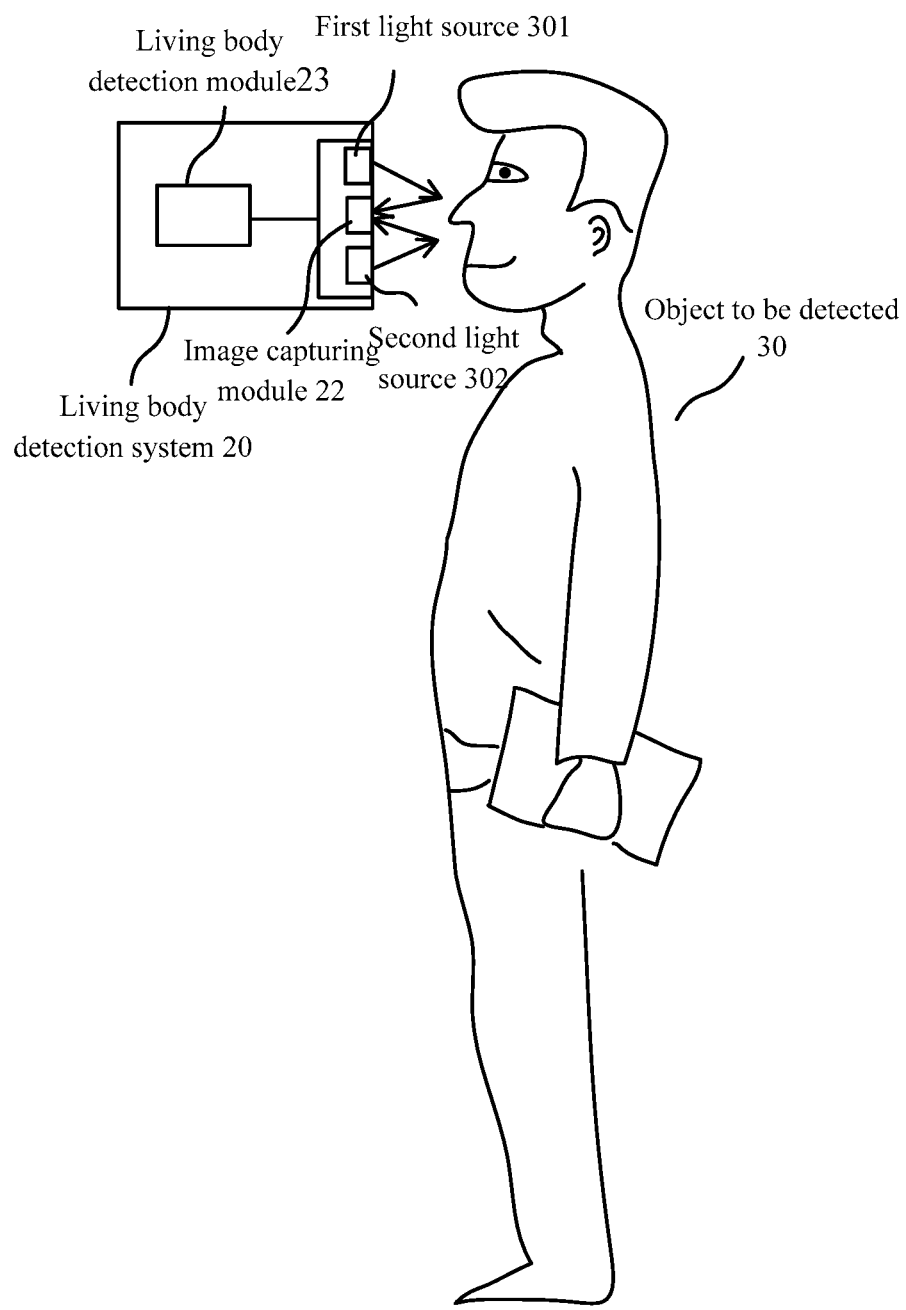
FIG. 3 is a schematic diagram further illustrating a living body detection system according to an embodiment of the present disclosure.

FIG. 3 is a schematic diagram further illustrating a living body detection system according to an embodiment of the present disclosure. As shown in FIG. 3, positions of the living body detection system 20 and the object 30 to be detected are relatively fixed. For example, the living body detection system 20 shown in FIG. 3 is a face card reader with a short working distance. The light source module 21, the image capturing module 22, and the living body detection module 23 are included in the living body detection system 20. Specifically, the light source module 21 in the living body detection system 20 shown in FIG. 3 includes a first light source 301 and a second light source 302. The first light source 301 and the second light source 302 may be controlled to be turned on to irradiate the face of the object 30 to be detected, respectively. As shown in FIG. 3, the first light source 301 and the second light source 302 may be disposed at periphery of the image capturing module 22 and integrally constructed together with the image capturing module 22. Further, in a preferred embodiment of the present invention, the first light source 301 and the second light source 302 are symmetrically disposed with respect to the image capturing module 22. The first light source 301 and the second light source 302 emit irradiation light to irradiate the face of the object to be detected, for example, irradiating lips, cheeks, nose, and the like. The image capturing module 22 shown captures an image of the face of the object to be detected as illuminated by the first light source 301 and the second light source 302. The living body detection module 23 shown determines whether the object to be detected is a living body.

Figure 4:
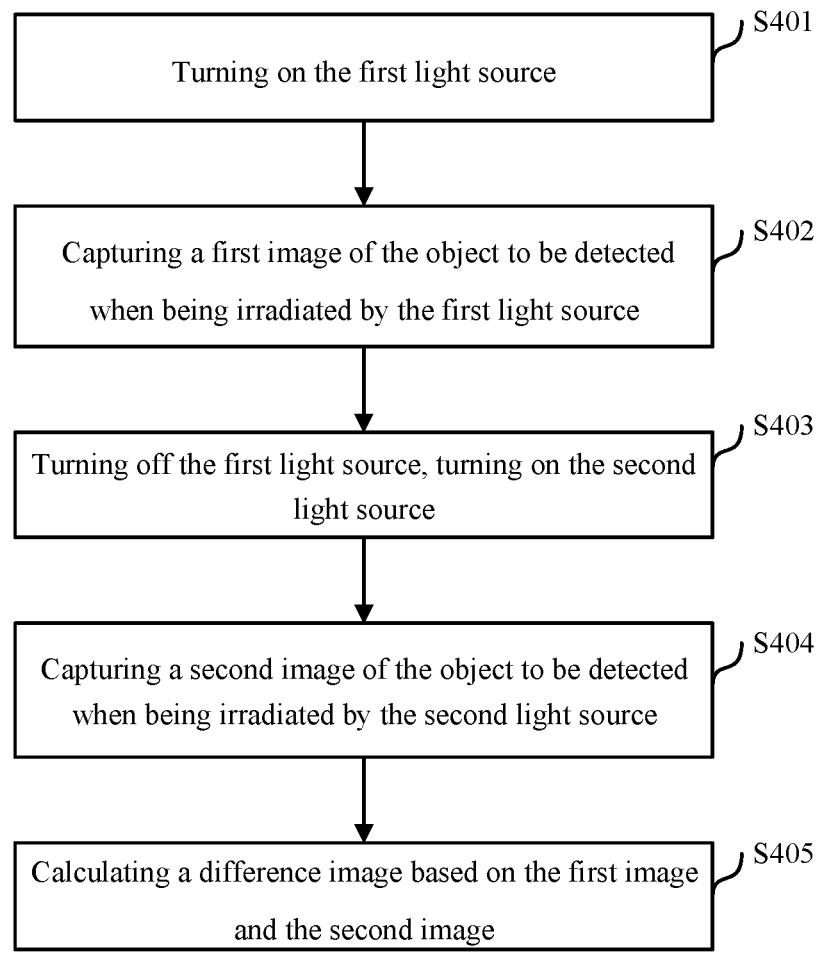
FIG. 4 is a flowchart further illustrating acquisition of the difference image to be detected in a first example according to an embodiment of the present disclosure.

FIG. 4 is a flowchart further illustrating acquisition of the difference image to be detected in a first example according to an embodiment of the present disclosure. acquisition of the difference image to be detected in a first example according to an embodiment of the present disclosure comprises the following steps.

In step S401, the first light source 301 is turned on. Thereafter, the processing advances to step S402.

In step S402, a first image of the object to be detected when being irradiated by the first light source 301 is captured. In an embodiment of the present disclosure, a first pixel value of the first image at a pixel dot (x,y) is I1 (x,y). Thereafter, the processing advances to step S403.

In step S403, the first light source 301 is turned off, the second light source 302 is turned on. Thereafter, the processing advances to step S404.

In step S404, a second image of the object to be detected when being irradiated by the second light source 302 is captured. In an embodiment of the present disclosure, a second pixel value of the second image at a pixel dot (x,y) is I2 (x,y). Thereafter, the processing advances to step S405.

In step S405, a difference image is calculated based on the first image and the second image. In an embodiment of the present disclosure, a difference image J(x,y) of the first image and the second image at a pixel dot (x,y) is calculated by using Expression (1):

$$J(x,y)=[I1(x,y)-I2(x,y)]/[I1(x,y)+I2(x,y)+eps] \quad (1)$$

wherein eps is a non-zero constant to avoid the case where the denominator in Expression (1) is zero.

In another embodiment of the present disclosure, a difference image J(x,y) of the first image and the second image at a pixel dot (x,y) is calculated by using Expression (2):

$$J(x,y)=[I1(x,y)/A(x,y)-I2(x,y)/B(x,y)]/[I1(x,y)/A(x,y)+I2(x,y)/B(x,y)+eps] \quad (2)$$

wherein eps is a non-zero constant, A(x,y) and B(x,y) are pre-set compensation images, the compensation images are compensating for deviation caused by brightness of the light sources, distance from the object to be detected, and so on.

The difference image J(x,y) acquired via the above steps S401 to S405 is supplied to the living body detection module 23 to carry out living body detection.

Figure 5:
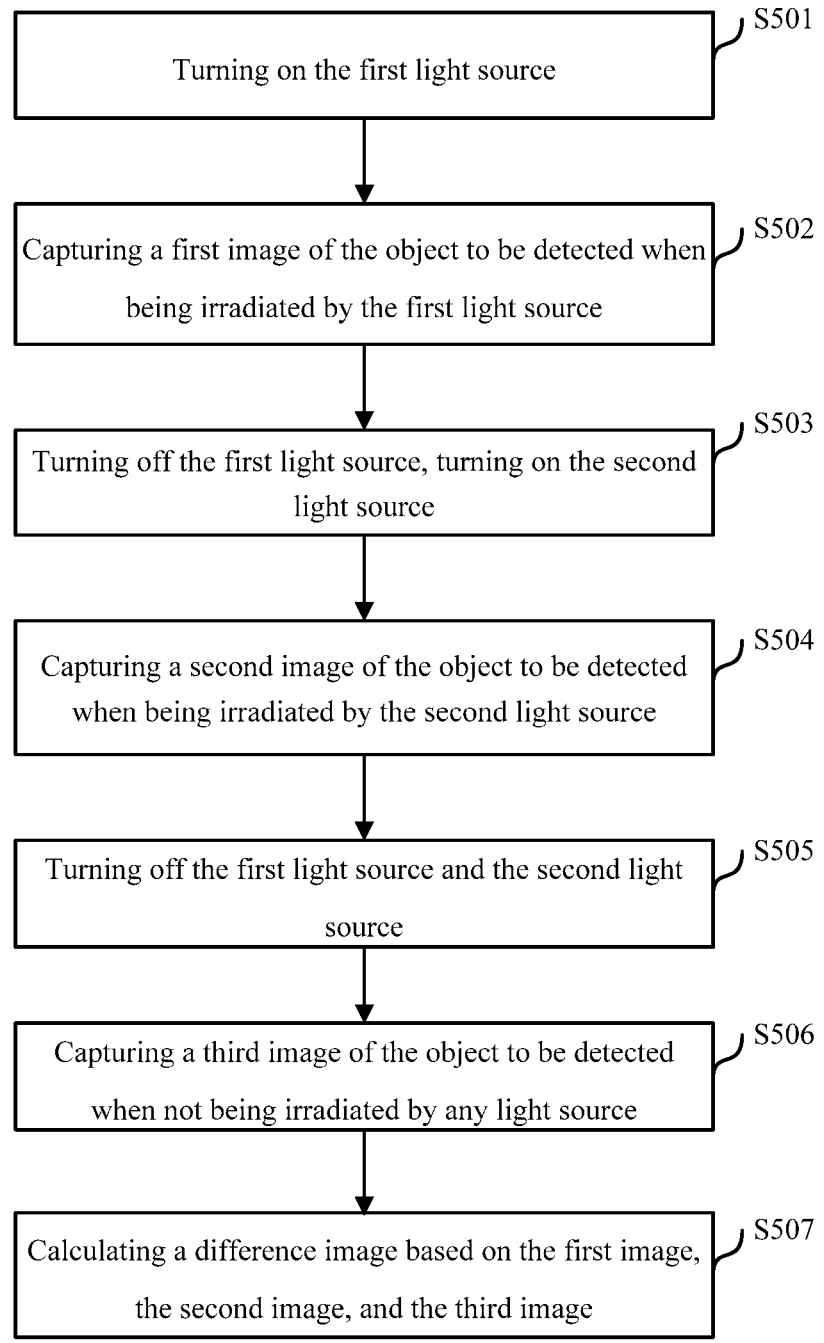
FIG. 5 is a schematic diagram further illustrating acquisition of the difference image to be detected in a second example according to an embodiment of the present disclosure.

FIG. 5 is a schematic diagram further illustrating acquisition of the difference image to be detected in a second example according to an embodiment of the present disclosure. Acquisition of the difference image to be detected in a second example according to an embodiment of the present disclosure comprises the following steps.

In step S501, the first light source 301 is turned on. Thereafter, the processing advances to step S502.

In step S502, a first image of the object to be detected when being irradiated by the first light source 301 is captured. In an embodiment of the present disclosure, a first pixel value of the first image at a pixel dot (x,y) is I1 (x,y). Thereafter, the processing advances to step S503.

In step S503, the first light source 301 is turned off, the second light source 302 is turned on. Thereafter, the processing advances to step S504.

In step S504, a second image of the object to be detected when being irradiated by the second light source 302 is captured. In an embodiment of the present disclosure, a second pixel value of the second image at a pixel dot (x,y) is I2 (x,y). Thereafter, the processing advances to step S505.

In step S505, the first light source 301 and the second light source 302 are both turned off. Thereafter, the processing advances to step S506.

In step S506, a third image of the object to be detected when not being irradiated by any light source is captured. In an embodiment of the present disclosure, a third pixel value of the third image at a pixel dot (x,y) is I3(x,y), Thereafter, the processing advances to step S507.

In step S507, a difference image is calculated based on the first image, the second image, and the third image.

In an embodiment of the present disclosure, a difference image J(x,y) of the first image, the second image, and the third image at a pixel dot (x,y) is calculation by using Expression (3):

$$J(x,y)=[I1(x,y)-I2(x,y)]/[(x,y)+I2(x,y)-I3(x,y)\times 2+eps] \quad (3)$$

wherein eps is a non-zero constant to avoid the case where the denominator in Expression (3) is zero.

In another embodiment of the present disclosure, a difference image J(x,y) of the first image, the second image, and the third image at a pixel dot (x,y) is calculated by using Expression (4):

$$J(x,y)=[(I1(x,y)-I3(x,y))/A(x,y)-I2(x,y)-I3(x,y))/B(x,y)]/[(I1(x,y)-I3(x,y))/A(x,y)+(I2(x,y)-I3(x,y))/B(x,y)+eps] \quad (4)$$

wherein eps is a non-zero constant, A(x,y) and B(x,y) are pre-set compensation images, the compensation images are compensating for deviation caused by brightness of the light sources, distance from the object to be detected, and so on.

The difference image J(x,y) acquired via the above steps S501 to S507 is supplied to the living body detection module 23 to carry out living body detection.

Figure 6:
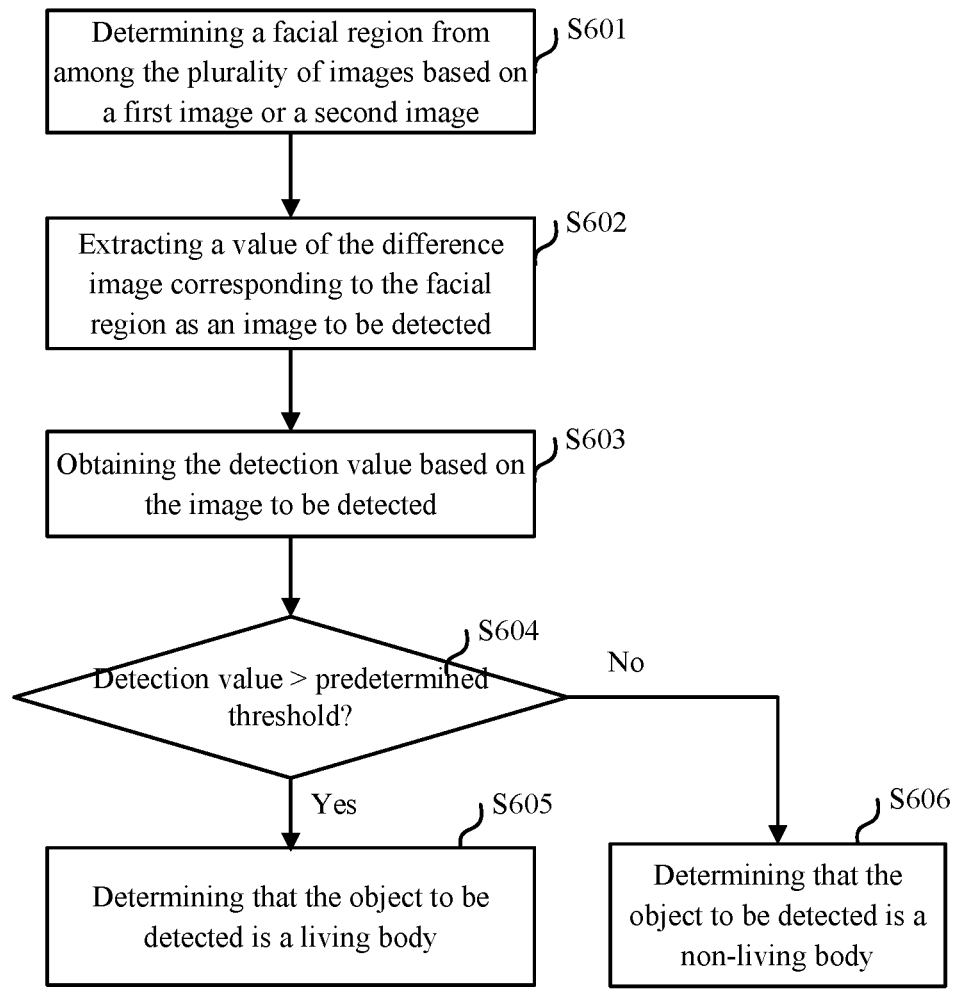
FIG. 6 is a flowchart further illustrating a living body detection based on the difference image to be detected according to an embodiment of the present disclosure.

FIG. 6 is a flowchart further illustrating a living body detection method based on the difference image to be detected according to an embodiment of the present disclosure. After the image to be detected is acquired through the first example shown in FIG. 4 or the second example shown in FIG. 5, the living body detection module 23 performs living body detection based on the image to be detected. The process of performing living body detection based on the image to be detected comprises the following steps.

In step S601, a facial region is determined from among the plurality of images based on a first image or a second image. For example, a pre-trained face detector (such as Haar Cascade) is used to obtain the facial region. Thereafter, the processing advances to step S602.

In step S602, a value of the difference image corresponding to the facial region is extracted as an image to be detected. In an embodiment of the present disclosure, a value corresponding to the facial region in the difference image J(x,y) is extracted and scaled to a fixed size as the image to be detected. Thereafter, the processing advances to step S603.

In step S603, the detection value is obtained based on the image to be detected. In an embodiment of the present disclosure, the image to be detected is inputted to a pre-trained image classifier, the image classifier generates and outputs the detection value corresponding to the image to be detected. In an embodiment of the present disclosure, the image classifier may be a pre-trained convolutional neural network (CNN). Thereafter, the processing advances to step S604.

In step S604, it is determined whether the detection value is larger than a predetermined threshold. The predetermined threshold is a value determined and set in advance using statistical learning methods such as deep learning, support vector machine, and the like, while taking a large number of face images as positive samples and taking photos, video playbacks, paper masks, and 3D model images as negative samples. In an embodiment of the present disclosure, the predetermined threshold may be set as 0.5.

If a positive result is obtained in step S604, that is, the detection value is larger than the predetermined threshold, the processing advances to step S605. In step S605, it is determined that the object to be detected is a living body.

Contrarily, if a negative result is obtained in step S604, that is, the detection value is not larger than the predetermined threshold, the processing advances to step S604. In step S604, it is determined that the object to be detected is a non-living body.

Figure 7:
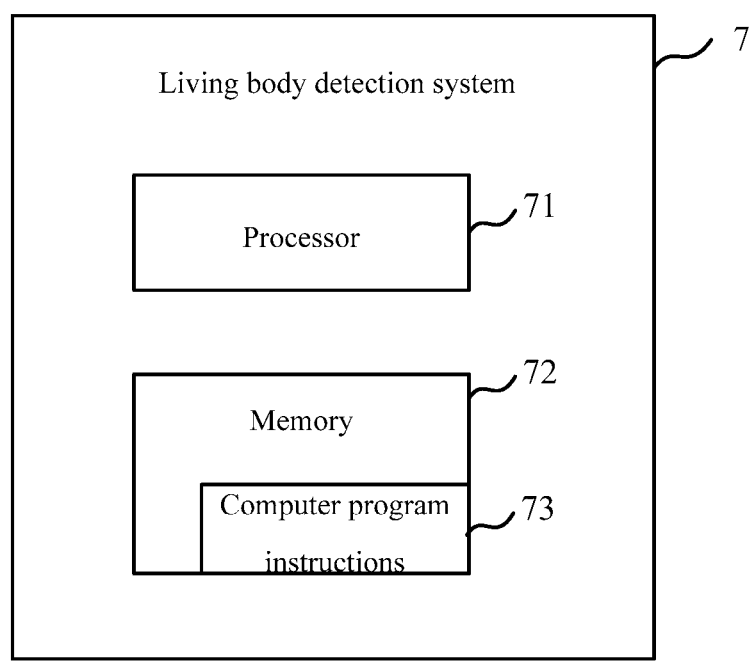
FIG. 7 is a schematic block diagram illustrating a living body detection system according to an embodiment of the present disclosure.

FIG. 7 is a schematic block diagram illustrating a living body detection system according to an embodiment of the present disclosure. As shown in FIG. 7, the living body detection system 7 according to an embodiment of the present disclosure comprises a processor 71, a memory 72, and computer program instructions 73 stored in the memory 72.

The computer program instructions 73 can achieve functions of respective functional modules of the living body detection system according to an embodiment of the present disclosure and/or execute respective steps of the living body detection method according to an embodiment of the present disclosure, when being run on the processor 71.

Specifically, when the computer program instructions 73 are run by the processor 71, the following steps are executed: capturing a plurality of images of a face of an object to be detected when being irradiated by each of at least two light sources arranged in different positions; calculating a difference image between the plurality of images; and obtaining a detection value of the difference image, and determining that the object to be detected is a living body if the detection value is larger than a predetermined threshold.

Respective modules in the living body detection system according to an embodiment of the present disclosure may be implemented by that the processor in the living body detection system according to an embodiment of the present disclosure run the computer program instructions stored in the memory, or may be implemented by that the computer program instructions stored in the computer-readable storage medium of the computer program product according to an embodiment of the present disclosure are run by a computer.

The computer-readable storage medium may be any combination of one or more computer-readable storage mediums, e.g., a computer-readable storage medium containing computer-readable program codes for randomly generating action instruction sequences, another computer-readable storage medium containing computer-readable program codes for carrying out authentication on face activities.

The computer-readable storage medium may for example include a memory card of a smart phone, a storage unit of a tablet computer, a hard disk of a personal computer, a random access memory (RAM), a read only memory (ROM), an erasable programmable read-only memory (EPROM), a portable compact disc read-only memory (CD-ROM), a USB memory, or a combination of any the aforesaid storage mediums.

Exemplary embodiments of the present disclosure as described in detail in the above are merely illustrative, rather than limitative. However, those skilled in the art should understand that, various modifications, combinations or subcombinations may be made to these embodiments without departing from the principles and spirits of the present disclosure, and such modifications are intended to fall within the scope of the present disclosure.

What is claimed is:

1. A living body detection method, comprising: irradiating a face of an object to be detected using each of at least two light sources arranged in different positions, respectively; capturing a plurality of images of the face of the object to be detected when being irradiated by each of the light sources; calculating a difference image between the plurality of images; and obtaining a detection value of the difference image, and determining that the object to be detected is a living body when the detection value is larger than a predetermined threshold: wherein obtaining the detection value of the difference image, and determining that the object to be detected is the living body when the detection value is larger than the predetermined threshold comprises: determining a facial region from among the plurality of images based on a first image or a second image; extracting a value of the difference image corresponding to the facial region as an image to be detected; obtaining the detection value based on the image to be detected; and comparing the detection value with the predetermined threshold, and determining that the object to be detected is the living body when the detection value is larger than the predetermined threshold;

wherein obtaining the detection value based on the image to be detected comprises: inputting the image to be detected into a pre-trained image classifier, generating and outputting, by the image classifier, the detection value corresponding to the image to be detected.

2. The living body detection method as claimed in claim 1, wherein the at least two light sources are a first light source and a second light source, the plurality of images are a first image when being irradiated by the first light source and a second image when being irradiated by the second light source, a first pixel value of the first image at a pixel dot (x,y) is I1 (x,y), and a second pixel value of the second image at a pixel dot (x,y) is I2 (x,y), and calculating a difference image between the plurality of images comprises:

calculating a difference image J(x,y) of the first image and the second image at a pixel dot (x,y)

$$J(x,y)=[I_1(x,y)-I2(x,y)]/[I_1(x,y)+I2(x,y)\pm eps]$$

wherein eps is a non-zero constant.

3. The living body detection method as claimed in claim 1, wherein the at least two light sources are a first light source and a second light source, the plurality of images are a first image when being irradiated by the first light source, a second image when being irradiated by the second light source, and a third image when not being irradiated by any of the at least two light sources, a first pixel value of the first image at a pixel dot (x,y) is I1 (x,y), a second pixel value of the second image at a pixel dot (x,y) is I2 (x,y), and a third pixel value of the third image at a pixel dot (x,y) is I3(x,y), calculating a difference image between the plurality of images comprises:

calculating a difference image J(x,y) of the first image, the second image, and the third image at a pixel dot (x,y), $$J(x,y)=[I_1(x,y)-I2(x,y)]/[I_1(x,y)+I2(x,y)-I3(x,y)\times 2+eps]$$

wherein eps is a non-zero constant.

4. The living body detection method as claimed in claim 1, wherein the at least two light sources are a first light source and a second light source, the plurality of images are a first image when being irradiated by the first light source and a second image when being irradiated by the second light source, a first pixel value of the first image at a pixel dot (x,y) is I1 (x,y), and a second pixel value of the second image at a pixel dot (x,y) is I2 (x,y), and calculating a difference image between the plurality of images comprises:

calculating a difference image J(x,y) of the first image and the second image at a pixel dot (x,y), $$J(x,y)=[I_1(x,y)/A(x,y)-I2(x,y)/B(x,y)]/[I_1(x,y)/A(x,y)+I2(x,y)/B(x,y)+eps]$$

wherein eps is a non-zero constant, A(x,y) and B(x,y) are pre-set compensation images.

5. The living body detection method as claimed in claim 1, wherein the at least two light sources are a first light source and a second light source, the plurality of images are a first image when being irradiated by the first light source, a second image when being irradiated by the second light source, and a third image when not being irradiated by any of the at least two light sources, a first pixel value of the first image at a pixel dot (x,y) is I1 (x,y), a second pixel value of the second image at a pixel dot (x,y) is I2 (x,y), and a third pixel value of the third image at a pixel dot (x,y) is I3(x,y), calculating a difference image between the plurality of images comprises:

calculating a difference image J(x,y) of the first image, the second image, and the third image at a pixel dot (x,y), $$J(x,y)=[(I1(x,y)-I3(x,y))/A(x,y)-I2(x,y)-I3(x,y))/B(x,y)]/[(I1(x,y)-I3(x,y))/A(x,y)+(I2(x,y)-I3(x,y))/B(x,y)+eps]$$

wherein eps is a non-zero constant, A(x,y) and B(x,y) are pre-set compensation images.

6. A living body detection system, comprising: a light source module including at least two light sources arranged in different positions, a face of an object to be detected being illuminated by each of the at least two light sources, respectively; an image capturing module for capturing a plurality of images of the face of the object to be detected when being irradiated by each of the light sources; a living body detection module for determining whether the object to be detected is a living body, wherein a method of determining whether the object to be detected is living comprises: calculating a difference image between the plurality of images; and obtaining a detection value of the difference image, and determining that the object to be detected is a living body when the detection value is larger than a predetermined threshold, wherein the living body detection module determines a facial region from among the plurality of images based on the a first image or the a second image, extracts a value of the difference image corresponding to the facial region as an image to be detected, obtains the detection value based on the image to be detected, compares the detection value with the predetermined threshold, and determines that the object to be detected is the living body when the detection value is larger than the predetermined threshold;

wherein the living body detection module further comprises a pre-trained image classifier that generates and outputs the detection value corresponding to the image to be detected.

7. The living body detection system as claimed in claim 6, wherein the at least two light sources are a first light source and a second light source, the plurality of images are a first image when being irradiated by the first light source and a second image when being irradiated by the second light source, a first pixel value of the first image at a pixel dot (x,y) is I1 (x,y), and a second pixel value of the second image at a pixel dot (x,y) is I2 (x,y), the living body detection module calculates a difference image J(x,y) of the first image and the second image at a pixel dot (x,y)

$$J(x,y)=[I1(x,y)-I2(x,y)]/[I1(x,y)+I2(x,y)+eps]$$

wherein eps is a non-zero constant.

8. The living body detection system as claimed in claim 6, wherein the at least two light sources are a first light source and a second light source, the plurality of images are a first image when being irradiated by the first light source, a second image when being irradiated by the second light source, and a third image when not being irradiated by any of the at least two light sources, a first pixel value of the first image at a pixel dot (x,y) is I1 (x,y), a second pixel value of the second image at a pixel dot (x,y) is I2 (x,y), and a third pixel value of the third image at a pixel dot (x,y) is I3(x,y), calculating a difference image between the plurality of images comprises:

the living body detection module calculates a difference image J(x,y) of the first image, the second image, and the third image at a pixel dot (x,y), $$J(x,y)=[(x,y)-I2(x,y)]/[(x,y)+I2(x,y)-I3(x,y)x2+eps]$$

wherein eps is a non-zero constant.

9. The living body detection system as claimed in claim 6, wherein the at least two light sources are a first light source and a second light source, the plurality of images are a first image when being irradiated by the first light source and a second image when being irradiated by the second light source, a first pixel value of the first image at a pixel dot (x,y) is I1 (x,y), and a second pixel value of the second image at a pixel dot (x,y) is I2 (x,y), and calculating a difference image between the plurality of images comprises:

the living body detection module calculates a difference image J(x,y) of the first image and the second image at a pixel dot (x,y), $$J(x,y)=[I1(x,y)/A(x,y)-I2(x,y)/B(x,y)]/[I1(x,y)/A(x,y)+I2(x,y)/B(x,y)+eps]$$

wherein eps is a non-zero constant, A(x,y) and B(x,y) are pre-set compensation images.

10. The living body detection system as claimed in claim 6, wherein the at least two light sources are a first light source and a second light source, the plurality of images are a first image when being irradiated by the first light source, a second image when being irradiated by the second light source, and a third image when not being irradiated by any of the at least two light sources, a first pixel value of the first image at a pixel dot (x,y) is I1 (x,y), a second pixel value of the second image at a pixel dot (x,y) is I2 (x,y), and a third pixel value of the third image at a pixel dot (x,y) is I3(x,y), calculating a difference image between the plurality of images comprises:

the living body detection module calculates a difference image J(x,y) of the first image, the second image, and the third image at a pixel dot (x,y), $$J(x,y)=[(I1(x,y)-I3(x,y))/A(x,y)-I2(x,y)-I3(x,y))/B(x,y)]/[(I1(x,y)-I3(x,y))/A(x,y)+(I2(x,y)-I3(x,y))/B(x,y)+eps]$$

wherein eps is a non-zero constant, A(x,y) and B(x,y) are pre-set compensation images.

11. The living body detection system as claimed in claim 6, wherein the at least two light sources are programmable light sources disposed at periphery of the image capturing module and integrally constructed together with the image capturing module.

12. The living body detection system as claimed in claim 11, wherein the at least two light sources are disposed symmetrically with respect to the image capturing module.

13. A non-transitory computer-readable medium on which computer program instructions configured to execute the following steps when being run by a computer are stored: capturing a plurality of images of a face of an object to be detected when being irradiated by each of at least two light sources arranged in different positions; calculating a difference image between the plurality of images; and obtaining a detection value of the difference image, and determining that the object to be detected is a living body when the detection value is larger than a predetermined threshold, wherein obtaining the detection value of the difference image, and determining that the object to be detected is the living body when the detection value is larger than the predetermined threshold comprises: determining a facial region from among the plurality of images based on a first image or a second image; extracting a value of the difference image corresponding to the facial region as an image to be detected; obtaining the detection value based on the image to be detected;

and comparing the detection value with the predetermined threshold, and determining that the object to be detected is the living body when the detection value is larger than the predetermined threshold;

wherein obtaining the detection value based on the image to be detected comprises: inputting the image to be detected into a pre-trained image classifier, generating and outputting, by the image classifier, the detection value corresponding to the image to be detected.

\* \* \* \* \*